United States Patent [19]
Christensen et al.

[11] Patent Number: 5,612,710
[45] Date of Patent: Mar. 18, 1997

[54] REAL TIME LOW COST, LARGE SCALE ARRAY 65K COLOR DISPLAY USING LAMPS

[75] Inventors: Thomas C. Christensen, Johnston; Jack L. Carter, Ankeny; Douglas E. DeVries, Johnston; Alan S. Foster; Jacques Y. Foster, both of Des Moines; William G. Phelps, Mitchellville; Timothy J. Prachar, San Jose; Daniel W. Smith; Michael W. Walter, both of Des Moines, all of Iowa

[73] Assignee: Fairtron Corporation, Des Moines, Iowa

[21] Appl. No.: 517,624

[22] Filed: Aug. 22, 1995

[51] Int. Cl.$^6$ .................... G09G 3/00; G09G 3/18
[52] U.S. Cl. ................. 345/30; 345/150; 345/55; 345/59; 345/147; 345/190; 345/211; 340/815.42; 340/815.53; 340/811; 358/532; 348/799; 348/808
[58] Field of Search ................ 345/30, 150, 55, 345/59, 147, 190; 340/815.42, 815.53, 811; 358/56, 532; 348/799, 803

[56] References Cited

U.S. PATENT DOCUMENTS

| | | | |
|---|---|---|---|
| 1,442,463 | 1/1923 | Bowman . | |
| 3,273,140 | 9/1966 | Foster et al. | 345/30 |
| 3,750,138 | 7/1973 | Burgan et al. | 340/334 |
| 3,961,365 | 6/1976 | Payne et al. | 358/59 |
| 4,118,763 | 10/1978 | Osteen | 362/339 |
| 4,186,394 | 1/1980 | Bobak et al. | 340/764 |
| 4,234,914 | 11/1980 | Boesen | 362/240 |
| 4,254,453 | 3/1981 | Mouyard et al. | 362/240 |
| 4,446,511 | 5/1984 | Sands | 362/267 |
| 4,531,121 | 7/1985 | Brown | 340/764 |
| 4,635,052 | 1/1987 | Aoike et al. | 340/811 |
| 4,683,491 | 7/1987 | Shimada et al. | 358/56 |
| 4,742,432 | 5/1988 | Thillays et al. | 361/400 |
| 4,833,542 | 5/1989 | Hara et al. | 358/230 |
| 4,843,527 | 6/1989 | Britt | 362/231 |
| 5,319,395 | 6/1994 | Larky et al. | 345/190 |
| 5,321,417 | 6/1994 | Voelzke et al. | 345/32 |
| 5,361,147 | 11/1994 | Katayama et al. | 358/532 |
| 5,428,365 | 6/1995 | Harris et al. | 345/55 |

*Primary Examiner*—Mark R. Powell
*Assistant Examiner*—Kuniki C. Lockett
*Attorney, Agent, or Firm*—Zarley, McKee, Thomte, Voorhees & Sease

[57] ABSTRACT

A large scale video display of the present invention is designed to receive a standard NTSC video signal and display it on a large scale array of low cost, voltage or current controlled lamp transducers. The video signals are received by a video capture device which receives and digitizes the video signal. A host processor formats the digital data into a number of 16 bit data words each corresponding to a pixel. A coprocessor receives the 16 bit data words and reformats the data. The reformatted data is connected to a large scale display by a fiber optic connection. The display includes a number of transceivers which receive the formatted video data in a memory buffer. The transceivers also receive a board map from the coprocessor. The map indicates which light boards correspond to each part of the memory where the frame image is stored. This information is used by a number of controllers to determine which lights to turn on and at what level of brightness for any given time.

62 Claims, 1 Drawing Sheet

REAL TIME LOW COST, LARGE SCALE ARRAY 65K COLOR DISPLAY USING LAMPS

BACKGROUND OF THE INVENTION

1. Field of the Invention

The present invention relates to video displays. More particularly, the present invention relates to a real time large scale array displaying 65,000 colors using low cost, voltage or current controlled lamp transducers.

2. Problems in the Art

In large venues such as sports stadiums, it is has become increasingly important to entertain and inform fans during sporting events, concerts, etc. Fans have shown their desire for large video displays of statistics, animations, video still frames, video clips, replays, etc., during sporting events and concerts. It can therefore be seen that there is a demand for a large video display system which is economical enough for most venues to afford and at the same time provides a high quality video image.

Traditional large scale video lamp arrays have been used to display recorded video through the use of arrays of photodetectors which in turn drove individual lamps. (See U.S. Pat. No. 3,273,140 Foster et al.) The early ability to reproduce wide color distributions and intensities necessary for real time video image reproduction on lamps was limited to that disclosed here. These light arrays of lamps have in more recent years been driven to display prestored graphics, animations and text by computers. In these implementations digital levels of intensity and color reproduction have been displayed. The problem has been devising a method of processing the video image to display an image in real time on a large scale array of lamps with affordable cost. Unlike in a television cathode ray tube where the analog intensity drives the acceleration of the electron beam and the drive is centralized, lamp array video requires high bandwidth real time digital processing of the intensity of individual pixels and distributing that information throughout the large display to achieve image reproduction on extensive lamp arrays.

Some implementations of video have involved utilizing decoded video to relieve the burden of real time processing of pixel intensities. This has been known as "L.I.V.E" video accomplished by Daktronics of South Dakota with limited color intensities. This precluded the instantaneous display of images from the playing field to a scoreboard.

Others such as Sony and Mitsubishi have assembled video images using large arrays of "Jumbotron" and "Diamond Vision" cathode ray tubes which incur substantial cost. Sony has patented a florescent display element as referenced in U.S. Pat. No. 4,683,491.

Some prior art systems use exotic light transducers, specialized digital processing units and fewer colors. These types of systems are primarily very expensive compared to the art disclosed here.

Traditional message centers on scoreboards use incandescent lamps to display text and animation. However traditional message centers will not accept high bandwidth digital data. In a traditional message center, a data line connects the host user interface computer to a driver which drives the controllers. This interface does not have a data transfer rate sufficient for real time video applications. The host transfers text, graphics and animation in 16 colors over the interface to the driver. This 16 color information is then be transferred to the controllers which energize certain individual lamps for an individual frame.

No prior art system has the capability of displaying real-time video having over 65,000 colors with a very low cost using standard lamps.

FEATURES OF THE INVENTION

A general feature of the present invention is the provision of a real time large scale array 65,536 color display using low cost, voltage or current controlled lamp transducers.

A further feature of the present invention is the provision of a real time large scale array 65,536 color display which is accomplished with minimal costs.

A further feature of the present invention is the provision of a real time large scale array 65,536 color display which can display real time video, traditional lamp graphics, animation, and text.

A further feature of the present invention is the provision of a real time large scale array 65,536 color display which uses low voltage lamp transducers in circular pixels using personal computers and coprocessors.

A further feature of the present invention is the provision of a real time large scale array 65,536 color display which optionally uses pulse width modulation to control the intensity of the individual lamps.

A further feature of the present invention is the provision of a real time large scale array 65,536 color display which can be used with sound to accompany a video image.

These as well as other features of the present invention will become apparent from the following specification and claims.

SUMMARY OF THE INVENTION

The large scale video display of the present invention is used to display real time video images using low cost, voltage or current controlled lamp transducers. The display includes a video capture device for receiving a standard video signal and digitizing the signal. A video processor takes the digitized signal and formats the digital signal. A video controller receives the formatted signal and partitions the signal into a number of sections. A number of lamp display portions are positioned together to form a large display. Each lamp portion is connected to the video controller to display the processed video image.

The video processor may include a main processor and a coprocessor for performing different steps of the formatting of the video signals. The video controller may be comprised of a number of transceivers and controllers for receiving the formatted data and controlling the lamps in order to display the video image.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention.

The present invention involves a real time large scale array displaying more than 65,000 colors using low cost, voltage or current controlled lamp transducers including, for example, incandescent lamps, low voltage fluorescent lamps, LEDs, etc. For the purposes of this description, the term "lamp" shall include any suitable transducers. The invention utilizes digital processing of a standard video signal into "65 thousand" color pixels and distributing the processed signals throughout a large scale lamp array and doing so with lamps at a very low cost. In order to process the video image in real time, a series of functions are integrated into an overall design which is efficient and affordable. The new and useful implementation of the present invention is a low cost, large scale display which can display real time video using more than 65,000 colors, traditional lamp graphics, animation, and text with low cost, low voltage lamp transducers.

Figure 1:
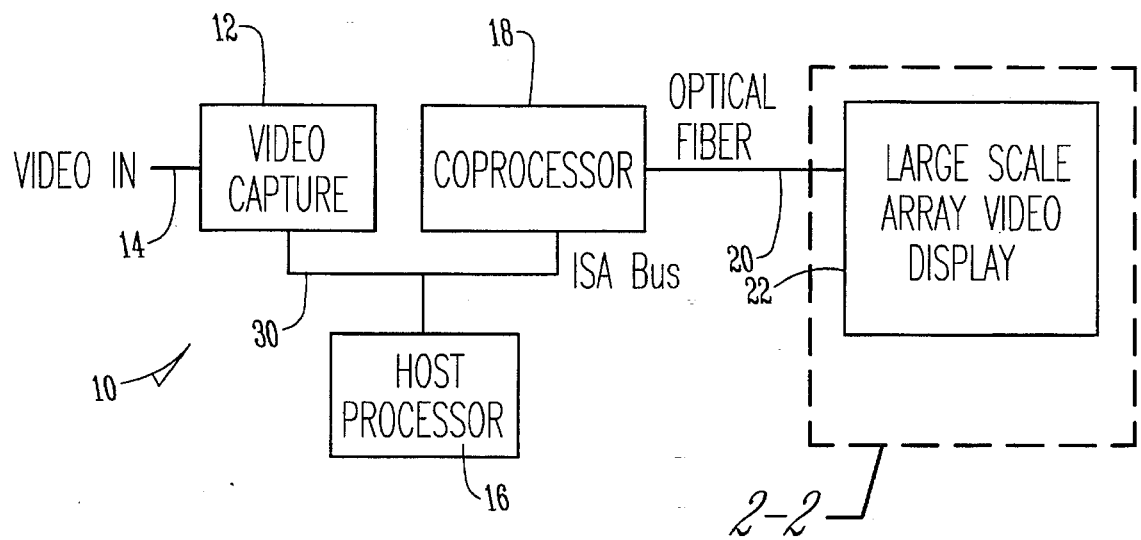
FIG. 1 is a block diagram of one embodiment of a system for displaying real time video on a large scale color display.

FIG. 1 is a block diagram of a system 10 for displaying real time video on a large scale 65,000 color display. The system 10 includes a video capture card 12 which captures and digitizes a standard video signal received at video input 14. The video capture card 12 is connected to a host processor 16 and a coprocessor 18 for processing and formatting the video data. The coprocessor 18 has a fiber optic connection 20 connected to a large scale color display 22.

Figure 2:
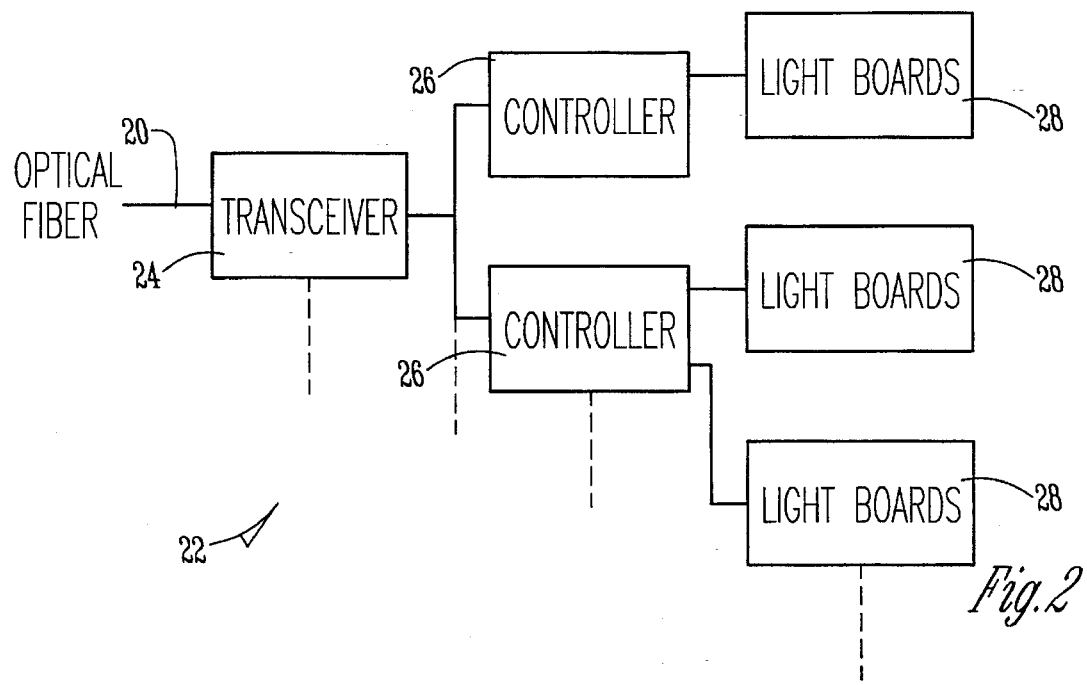
FIG. 2 is a block diagram of the large scale display shown in FIG. 1.

FIG. 2 is a block diagram of the large scale color display 22. The fiber optic connection 20 is connected to at least one transceiver 24. The transceiver 24 takes the video data and sends certain data to a number of controllers 26. The controllers 26 are used to control a plurality of light boards 28 which are each comprised of an array of lamps. Together, the light boards 28 form a single large scale display. The preferred embodiment uses a 120×160 large scale lamp array with 2 transceivers, 10 controllers, and 300 lamp cards with 64 lamps per card. However, the number of transceivers, controllers and light boards depends on the particular installation.

The various components of the system 10 shown in FIGS. 1 and 2 operate together as follows.

Video Data Stream

The video frame data stream is created by the video capture card 12 which performs an analog to digital (A/D) conversion of the video signal present at the video input 14. The video input is digitized into video frame data in YUV (4,2,2) format for each pixel. Note that other YUV formats could also be used. The video frame data is then read by the host processor 16. The host processor 16 converts the YUV data into a RGBW (Red Green Blue White) 16 bit data word for each pixel and writes the words to the coprocessor 18 one frame at a time. The coprocessor 18 formats the data into alternating rows of RGRG . . . and BWBW . . . so that each pixel is represented by a 2 row by 2 column quad pattern of RGBW spots to make "pixels" each having a red, green, blue and white component. The coprocessor 18 also converts any text, graphics or animation data into this format as well. Finally, the coprocessor 18 transfers each formatted frame over the fiber optic connection 20 to the large scale color display 22. Each formatted frame is transferred to the transceiver 24 along with a board map which describes which lamp information is placed in each area of the large scale lamp array. The transceiver 24 receives the formatted data and assigns the information to each controller 26 according to the board map. Each controller 26 is connected to a number of light boards 28 and turns on the appropriate lamps at the appropriate intensity level for each frame.

Video Capture

The video capture card 12 receives a standard National Television System Committee (NTSC) composite video image from the video input 14 and digitizes the image into a YUV digital format where 4 bits per pixel describe the Y or luminance and 2 bits each describes the luminance and chrominance. The YUV value for each pixel is available to the host processor 16 by polling the video capture card 12 over the ISA bus 30. The video capture card 12 can select from any of three video sources.

Processing

The host processor 16 receives the digitized YUV pixel information, calculates the red, green and blue digital values and stores the values in the coprocessor 18.

The 8 bits per pixel (4,2,2) of YUV data is requested by the processor 16 in a series of queries to the video capture card 12. The U and V data along with the Y data for each pixel is combined in a color space conversion that is listed in the Philips Video Data Handbook, June 1994, pages 1–64. The conversion is listed as follows:

$$R=Y-1.371*V$$

$$G=Y-0.698*V-0.336*U,$$

$$B=Y+1.732*U$$

$$W=Y$$

The 4 most significant bits are combined to produce a digital 4 bit red, green and blue value for each pixel. These values are combined into a 16 bit word for each pixel which is then written to the coprocessor card 18. The format of the 4 bit nibbles in the resulting word is 4 bits of white in the most significant nibble, then 4 bits of blue, then 4 bits of green and finally 4 bits of red in the least significant nibble of the 16 bit word. The 16 bit word is written to the memory address of the shared memory on the coprocessor 18 with the appropriate handshakes. When one frame is complete the host processor 16 will poll the video capture card 12 to see if the next frame is ready and begin the pixel transfer, color calculation and pixel coprocessor operations over again.

"65 thousand" colors are achieved in the 16 bit word with 4 red, 4 green, 4 blue and 4 white bits per color which combine to make 65,536 colors or 2 raised to the 16th power. This is the most efficient packing in 16 bits and is also compatible with most personal computer systems. This also limits the cost of subsequent coprocessing units by maintaining a 16 bit per pixel word.

The processor 16 is also available for user interface processing and the creation of text, animation and graphics files which are formatted differently but transferred to the same coprocessor card shared memory area for formatting and displaying along with or separate from the video images.

For video data, the coprocessor 18 moves the individual pixel frame information from the shared memory area and reformats it into alternating rows of RGRG . . . and BWBW . . . as described above. The reformatted data is sequentially represented in linear memory with each row following the last with the top left of a frame being in the lowest memory address of the frame.

For text, graphics and animation data, the coprocessor 18 converts the file from a 16 bit color format to over 65,000 color values in an alternating RGRG . . . and BWBW . . . row pattern to match that of the video. The data is then transferred via the fiber optics connection 20 to the transceiver 24 in the large scale color display 22.

Display

The transceiver 24 receives the formatted video data from the coprocessor 18 in a memory buffer from the fiber optic receivers via the fiber optic connection 20. Periodically, a board map is also received from the coprocessor 18 in the memory buffer. The board map indicates which light boards 28 correspond to each part of linear memory where the frame image is stored in the transceiver 24. Using the most recent board map the formatted video is sent to the controllers 26 over an RS-485 interface transmitter. This information is used by each controller 26 to determine which lights to turn on and the level of brightness for each light.

Each controller 26 receives information from the transceiver 24 over a dedicated individual controller bus and stores it in a memory buffer. When the frame is formatted, the resulting data is in a lamp nibble format indicating the desired intensity of each lamp. The lamps are turned on at different times during the full AC input voltage cycle. The amount of time each lamp is turned on depends on the desired intensity with levels 15 through 8 being turned on proportionately during the first half cycle and levels 15 through 7 being turned on at the beginning of the second half cycle with the rest turned on during the remaining cycle with a part of the waveform reserved for being turned on only enough to heat the filament but not enough to output visible light. Pulse width modulation (PWM) is used by the controller to control the intensity of the individual lamps. Alternatively, amplitude adjustment could be used instead of or along with PWM.

The lamp intensity nibble has a bit level from 0 through 15. The controller 26 sequences through the memory buffer looking for the bit level 15 (or 1111 in binary) which indicates the highest intensity. This process starts at the positive zero crossing of the AC power cycle. The nibbles that match the intensity have a 1 stored in the level 15 phase A binary memory table. Then a search for intensity level 14 is conducted and again those nibbles that match have a 1 stored in the level 14 phase A binary memory table. This continues on for each intensity level through zero.

During the level intensity level 7 (which happens at the negative zero crossing, or half way through the power cycle) all higher intensity values are also given a 1 so that the triac can be turned on after the AC power zero crossing. This operation is performed while the phase B binary memory table is used to turn on lamps at decrementing intensity levels upon interrupt.

During the interrupt the lamp triacs are addressed using a row and column technique to energize those lamps with a 1 in that level's lamp table. When the interrupt function is complete the processor continues creating map tables for B cycle display.

At intensity level zero at the interrupt level after the zero table is displayed the remaining lamps are energized regardless of the desired intensity of each lamp. This energizing time is short enough that no visible light results, but the lamp life if increased by keeping the lamp filament temperature at a level just below where it would emit visible light at the levels which would be evident to an observer.

The controller performs positive zero crossing detection of the 60 Hz AC input power so that the intensity level values are initiated synchronous in the power cycle synonymous with the time necessary to deliver the appropriate power intensity to the lamp. Since the preferred embodiment uses triacs there is no current need to turn the triacs off at the next zero cross. However, lamp power driver implementations which would require turning off the energy flow to the lamps at ending zero cross are also possible within the scope of the present invention.

In the preferred embodiment, 30 frames per second, or 60 half-frames per second, are displayed in real time. The present invention also allows other frame rates, for example, 15 frames per second or 60 frames per second.

An alternative embodiment described below operates in a way similar to the embodiment described above.

Video Data Stream—Second Embodiment

The video frame data stream is created by the video capture card 12 as described above except the data is digitized in RGB format. The video frame data is then read by the host processor 16 in a RGB format for each pixel. Note that the RGB data can be in any RGB format, for example, the RGB data could be in (5,6,5) or (8,8,8) format or any modification of them. Also, not all bits need to be used. The system could truncate some of the least significant bits. The host processor 16 then calculates a Y (or luminance) for each pixel from the RGB data. The most significant 4 bits or nibble of each color (red, green, blue and white) are merged into a RGBW 16 bit data word for each pixel which is then written to the coprocessor 18 in subframe segments on the ISA bus. Frame segmenting is used when the coprocessor shared memory is limited to 16 Kbytes. The frame image is concurrently resegmented for transfer from the coprocessor 18 to the transceiver 24. Text, graphics or animation files are converted to the 65K format and are available for overlay over the video data or as an independent feed to the transceiver 24. The transceiver reformats the image segment data into alternating rows of RGRG . . . and BWBW . . . as discussed above. The transceiver also receives periodic updates of the board map table from the coprocessor which it uses to map the linear image memory to specific controllers. The image is transferred via the map information to the controllers via a dedicated interface for each controller. The controllers control the intensity values for each lamp as described above.

Video Capture

The video capture card 12 takes a standard NTSC composite video image input and digitizes the image into a YUV digital format comprised of 16 bit words per pixel with 5 bits each describing the red (R), green (G), and blue (B) intensities. The video capture card 12, utilizing bus mastering on the PCI bus, takes control of the bus and transfers the frame image over the bus to the host processor memory. When the frame transfer is complete, an interrupt is issued or polling memory location is set identifying that the transfer is complete.

Processing

Once the frame transfer is complete, the host begins calculating white values based on the following algorithm:

$$W=Y=0.5\ R+0.25\ G+0.125\ B$$

This is a rounding of the formula expressed in the Philips video handbook referenced above. The color values are merged into a 16 bit word with the 4 most significant bits used for each color producing a single 16 bit word with 4 bits each of RGBW. Each word is then written to the coprocessor 18 over the ISA bus in frame image segments no larger than 16 Kbytes. Handshaking is performed with the coprocessor 18 to assure that the shared memory on the coprocessor 18 is not overwritten by the next frame image segment. Board map tables are used by the coprocessor 18 to enable the transceivers 24 to correlate the individual pixel data to the large scale video array.

For video data, the coprocessor 18 moves the segmented frame image data into memory to reconstruct a full frame and at the same time transfers segments of the previous frame to the transceivers 24 through the optical fiber connection 20. The image segments are identified with individual addressing so that each transceiver 24 receives the appropriate segment.

Display

The transceiver 24 receives the frame segment data in a memory buffer from the coprocessor 18 and formats it into alternating RGRG . . . and BWBW . . . rows so that each pixel is represented by a 2 row by 2 column quad pattern of RGBW spots. In memory, the RGRG . . . pattern repeats in linear memory until the end of the row, then the BWBW . . . pattern occupies the next consecutive memory and so on. Periodically the board map is also received in the memory buffer from the coprocessor 18. Using the most recent board map the formatted video is allocated to the controllers 26. The board map indicates which lamps correspond to which parts of linear memory where the frame segment is stored in the transceiver 24.

The controller operates as described above.

The host processor 16 in the preferred embodiment is the primary user interface for the system 10. The host processor can be comprised of any processor capable of operating as described above. The processor 16 in the preferred embodiment is comprised of a Gateway 2000 P5-60 personal computer utilizing a 60 MHz Intel Pentium Processor and having eight megabytes RAM, several ISA and PCI slots available, and having dedicated local BUS graphics for high performance graphics with two megabytes video RAM. Alternatively, the user interface could consist of specially built processing cards. While ISA bus 30 is used as the primary interface between the host processor 16, video capture card 12, and coprocessor 18, higher speed buses such as PCI buses could also be used. Similarly the various components of the present invention could connected using fiber optic links.

The configuration of the light boards 28 can also take on many forms. Preferably, the individual lights are arranged in rows and columns to form a number of pixels each comprising four lamps. In this way, a pixel is represented by a two row by two column quad pattern with the top row comprised of a red and green light and the bottom row comprised of a blue and white light. Each individual light uses a standard light bulb. The lamps are positioned behind a colored lens resulting in the different colors. The lamps used could also be colored themselves rather than using colored lenses. Also, the lamps could be enhanced in various ways, for example using Xenon gas lamps, to improve the intensities at desired colors, lower the cost, or otherwise improve the system. Also note that the present invention could be used with monochrome displays without colored lamps and also with displays having one lamp per pixel.

The lens system utilizes a circular opening to reduce the distorting edge effects found with square light openings. This allows spots to take on a softer appearance when viewed from longer distances. However, the use of square, hexagonal, or other shapes for lamps and pixels could be used with the present invention.

The use of individual lamp control over video is claimed for the insertion of text over video as opposed to text interspersed in the NTSC composite video stream. The use of similar implementations of graphics over video and animation over video is also achieved using the present invention. The unique implementation of the system allows individual lamp control while still providing video images.

The use of video in windows is claimed where video can be present in one window or multiple video sources can be used in multiple windows. Combinations of text, graphics and animation over multiple video windows is also possible. Combinations of text graphics and animations in windows with or without concurrent display of video in other windows is also possible.

The display system 10 can be used with sound accompanying a video source or synthesized from a number of potential sources.

Other possible embodiments include the use of 32 bit words which could produce over 4.3 billion colors with 8 bits per red, green, blue and white or other combinations where multiple green spots, multiple blue spots, or any other multiple color implementation per pixel is used. Similarly, designs using pixels consisting of only red, green or blue could be utilized. Similarly, systems using pairs of these primary colors, single colors or like combinations of complementary colors could be used. Of course designs where more or less colors are used than exactly 65,536 or 4,294,967,296 could be used. If non visible output is counted, then these levels are transformed into 83,521 and 4,362,470,401, respectively.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A large scale color video display comprising:

a video capture device for receiving video signals and converting the video signals into digitized video signals;

a video processor electrically connected to the video capture device for receiving and processing the digitized video signals and formatting the digitized video signals into multicolor pixel words, wherein each word includes multicolor data for a single pixel of a large scale video display;

a video controller connected to the video processor for receiving the formatted video signals including the multicolor pixel words and partitioning the formatted video signals into a plurality of sections; and a plurality of lamp display grids positioned together to form a large scale display, said lamp display grids each being connected to the video controller for displaying one of the plurality of sections of formatted video signals.

2. The large scale video display of claim 1 wherein said video processor further comprises:

a first processor for receiving the digitized video signals from the video capture device and formatting the digitized video signals into the multicolor pixel words each corresponding to at least one lamp on the large scale display; and a coprocessor for receiving the words and reformatting the data into alternating rows of data such that the pixels are formed and are comprised of displayed data from two consecutive rows of data.

3. The large scale video display of claim 2 wherein each multicolor pixel word is a 16 bit word including 4 sets of 4 bits, each set describing a color.

4. The large scale video display of claim 1 wherein said video processor further comprises:

a first processor for receiving the digitized video signals from the video capture device and formatting the the digitized video signals into the multicolor pixel words each comprising a 32 bit data word corresponding to a single pixel on the large scale display; and a coprocessor for receiving the 32 bit data words and reformatting the data into alternating rows of data such that the pixels are formed comprising displayed data from two consecutive rows of data.

5. The large scale video display of claim 1 wherein said video capture device receives the video signal and converts the signal into RGB format.

6. The large scale video display of claim 5 wherein said processor receives the digitized video signals in RGB format and converts the signal into RGBW format.

7. The large scale video display of claim 6 wherein said processor converts the digitized video signals into RGBW format by calculating RGBW values from the RGB values.

8. The large scale video display of claim 7 wherein said processor converts the digitized video signals into RGBW format by calculating a white value based on the relationship $W=0.5 R+0.25 G+0.125 B$.

9. The large scale video display of claim 1 wherein said video capture device receives the video signal and converts the signal into YUV format.

10. The large scale video display of claim 9 wherein said processor receives the video signal in YUV format and converts the signal into RGBW format.

11. The large scale video display of claim 1 wherein said multicolor pixel words are comprised of 16 bit words.

12. The large scale video display of claim 11 wherein each of said 16 bit words has four bits corresponding to each of red, blue, green, and white color levels.

13. The large scale video display of claim 1 wherein said multicolor pixel words are comprised of 32 bit words.

14. The large scale video display of claim 13 wherein each of said 32 bit words has eight bits corresponding to each of red, blue, green, and white color levels.

15. The large scale video display of claim 1 wherein the video processor transmits the multicolor pixel words to the video controller over a fiber optic connection.

16. The large scale video display of claim 1 wherein the said video controller further comprises:

at least one transceiver for receiving and partitioning the video data; and a plurality of control devices each connected to one of the transceivers for receiving video data and controlling individual lamp intensities.

17. A method of displaying real-time color video images comprising the steps of:

capturing a plurality of frames of video images from a video source;

converting each frame into digital data;

calculating color values from the digital data and formatting the data into a color pixel format by creating a single word for each pixel wherein each word includes data corresponding to multiple colors and intensities for each pixel;

providing a plurality of lamps positioned together to form a video display;

partitioning said plurality of lamps into a plurality of grids;

partitioning the formatted data from each frame into a plurality of sets of data, each set corresponding to one of the grids of lamps and each set including the words corresponding to contiguous lamps within each pixel in each respective grid;

controlling each lamp grid by addressing and controlling each individual lamp based on the sets of data such that a representation of the frame of the video image is displayed; and sequentially displaying the plurality of frames of video images.

18. The method of claim 17 further comprising the step of:

selectively controlling the intensity of each individual lamp by turning on the lamp for a certain amount of time, said amount of time being dependent upon the desired intensity.

19. The method of claim 17 further comprising the step of:

selectively controlling the intensity of each individual lamp by powering the lamps with a voltage having an amplitude dependent on the desired intensity of each individual lamp.

20. The method of claim 17 further comprising the step of:

selectively controlling the intensity of each individual lamp by turning on the lamp for a certain amount with a voltage having an certain amplitude, said certain amount of time and certain voltage both being dependent on the desired intensity of each individual lamp.

21. The method of claim 17 further comprising the steps of:

selectively controlling the intensity of each individual lamp by turning on the lamp at a time after an AC power signal zero crossing based on a digital lamp intensity value and leaving the lamp on for the remainder of that half cycle of the AC power.

22. The method of claim 17 further comprising the step of:

turning on all of the lamps for a certain amount of time during each cycle of the AC power signal to extend lamp life.

23. The large scale video display of claim 1 wherein the video processor is capable of receiving image data, formatting the image data into multicolor pixel words, and combining the image data with the digitized video signals.

24. The method of claim 17 further comprising the steps of:

providing secondary image data;

formatting the secondary image data into image data words;

combining the image data words with the words from the video source before displaying the plurality of frames of video images.

25. An apparatus for processing and displaying video information over a plurality of pixels forming a large scale video display comprising:

a video capture device for receiving a plurality of frames of video signals from a video source and converting the video signals into digital video signals;

a video processor electrically connected to the video capture device for receiving the digital video signals and formatting the digital video signals by creating a single multicolor data word corresponding to each pixel of the video display, each multicolor data word containing data relating to multiple colors and intensities for a single pixel;

a video controller connected to the video processor for receiving the formatted video signals and partitioning the formatted video signals into a plurality of sections; and a plurality of light boards each comprising a portion of the plurality of pixels, said light boards each being connected to the video controller for displaying one of the plurality of sections of formatted video signals.

26. The large scale color video display of claim 1 wherein the multicolor pixel words contain all of the place values for each color of each pixel.

27. The large scale video display of claim 26 wherein said video processor further comprises:

a first processor for receiving the digitized video signals from the video capture device and formatting the digitized video signals into the multicolor pixel words each corresponding to at least one lamp on the large scale display; and a coprocessor for receiving the words and reformatting the data into alternating rows of data such that the pixels are formed and are comprised of displayed data from two consecutive rows of data.

28. The large scale video display of claim 27 wherein each multicolor pixel word is a 16 bit word including 4 sets of 4 bits, each set describing a color.

29. The large scale video display of claim 26 wherein said video processor further comprises:

a first processor for receiving the digitized video signals from the video capture device and formatting the digitized video signals into the multicolor pixel words each comprising a 32 bit data word corresponding to a single pixel on the large scale display; and a coprocessor for receiving the 32 bit data words and reformatting the data into alternating rows of data such that the pixels are formed comprising displayed data from two consecutive rows of data.

30. The large scale video display of claim 26 wherein said video capture device receives the video signal and converts the signal into RGB format.

31. The large scale video display of claim 30 wherein said processor receives the digitized video signals in RGB format and converts the signal into RGBW format.

32. The large scale video display of claim 31 wherein said processor converts the digitized video signals into RGBW format by calculating RGBW values from the RGB values.

33. The large scale video display of claim 32 wherein said processor converts the digitized video signals into RGBW format by calculating a white value based on the relationship $W=0.5 R+0.25 G+0.125 B$.

34. The large scale video display of claim 26 wherein said video capture device receives the video signal and converts the signal into YUV format and wherein said processor receives the video signal in YUV format and converts the signal into RGBW format.

35. The large scale video display of claim 26 wherein said multicolor pixel words are comprised of 16 bit words.

36. The large scale video display of claim 35 wherein each of said 16 bit words has four bits corresponding to each of red, blue, green, and white color levels.

37. The large scale video display of claim 26 wherein said multicolor pixel words are comprised of 32 bit words.

38. The large scale video display of claim 37 wherein each of said 32 bit words has eight bits corresponding to each of red, blue, green, and white color levels.

39. The large scale video display of claim 26 wherein the video processor transmits the multicolor pixel words to the video controller over a fiber optic connection.

40. The large scale video display of claim 26 wherein said video controller further comprises:

at least one transceiver for receiving and partitioning the video data; and a plurality of control devices each connected to one of the transceivers for receiving video data and controlling individual lamp intensities.

41. A large scale monochrome video display comprising:

a video capture device for receiving video signals and converting the video signals into digitized video signals;

a video processor electrically connected to the video capture device for receiving and processing the digitized video signals and formatting the digitized video signals into monochrome pixel words, wherein each word includes monochrome data for a single pixel of a large scale video display and wherein the monochrome pixel words each contain all of the place values for the data for each respective pixel;

a video controller connected to the video processor for receiving the formatted video signals including the monochrome pixel words and partitioning the formatted video signals into a plurality of sections; and a plurality of lamp display grids positioned together to form a large scale display, said lamp display grids each being connected to the video controller for displaying one of the plurality of sections of formatted video signals.

42. The large scale video display of claim 41 wherein said video processor further comprises:

a first processor for receiving the digitized video signals from the video capture device and formatting the digitized video signals into the monochrome pixel words each corresponding to at least one lamp on the large scale display; and a coprocessor for receiving the words and reformatting the data into rows of data such that the pixels are formed and are comprised of displayed data from at least one lamp.

43. The large scale video display of claim 42 wherein each monochrome pixel word is a 16 bit word.

44. The large scale video display of claim 41 wherein said video processor further comprises:

a first processor for receiving the digitized video signals from the video capture device and formatting the digitized video signals into the monochrome pixel words each comprising a 32 bit data word corresponding to a single pixel on the large scale display; and a coprocessor for receiving the 32 bit data words and reformatting the data into rows of data such that the pixels are formed comprising displayed data from at least one lamp.

45. The large scale video display of claim 41 wherein said monochrome pixel words are comprised of 4 bit words.

46. The large scale video display of clam 41 wherein said monochrome pixel words are comprised of 8 bit words.

47. The large scale video display of claim 41 wherein the video processor transmits the monochrome pixel words to the video controller over a fiber optic connection.

48. The large scale video display of claim 41 wherein the said video controller further comprises:

at least one transceiver for receiving and partitioning the video data; and a plurality of control devices each connected to one of the transceivers for receiving video data and controlling individual lamp intensities.

49. A method of displaying real-time monochrome images comprising the steps of:

capturing a plurality of frames of video images from a video source;

converting each frame into digital data;

calculating monochrome values from the digital data and formatting the data into a monochrome pixel format by creating a single word for each pixel wherein each word includes data corresponding to the intensity for each pixel and wherein each word contains all of the place values for the intensity of each respective pixel;

providing a plurality of lamps positioned together to form a video display;

partitioning said plurality of lamps into a plurality of grids;

partitioning the formatted data from each frame into a plurality of sets of data, each set corresponding to one of the grids of lamps and each set including the words corresponding to contiguous lamps within each pixel in each respective grid;

controlling each lamp grid by addressing and controlling each individual lamp based on the sets of data such that a representation of the frame of the video image is displayed; and sequentially displaying the plurality of frames of video images.

50. The method of claim 49 further comprising the step of:

selectively controlling the intensity of each individual lamp by turning on the lamp for a certain amount of time, said amount of time being dependent upon the desired intensity.

51. The method of claim 49 further comprising the step of:

selectively controlling the intensity of each individual lamp by powering the lamps with a voltage having an amplitude dependent on the desired intensity of each individual lamp.

52. The method of claim 49 further comprising the step of:

selectively controlling the intensity of each individual lamp by turning on the lamp for a certain amount of time with a voltage having a certain amplitude, said certain amount of time and certain voltage both being dependent on the desired intensity of each individual lamp.

53. The method of claim 49 further comprising the steps of:

selectively controlling the intensity of each individual lamp by turning on the lamp at a time after an AC power signal zero crossing based on a digital lamp intensity value and leaving the lamp on for the remainder of that half cycle of the AC power.

54. The method of claim 49 further comprising the step of:

turning on all of the lamps for a certain amount of time during each cycle of the AC power signal to extend lamp life.

55. A method of displaying real-time color video images comprising the steps of:

capturing a plurality of frames of video images from a video source;

converting each frame into digital data;

calculating color values from the digital data and formatting the data into a color pixel format by creating a single word for each pixel wherein each word includes data corresponding to multiple colors and intensities for each pixel and wherein each word contains all of the place values for each color of each respective pixel;

providing a plurality of lamps positioned together to form a video display;

partitioning said plurality of lamps into a plurality of grids;

partitioning the formatted data from each frame into a plurality of sets of data, each set corresponding to one of the grids of lamps and each set including the words corresponding to contiguous lamps within each pixel in each respective grid;

controlling each lamp grid by addressing and controlling each individual lamp based on the sets of data such that a representation of the frame of the video image is displayed; and sequentially displaying the plurality of frames of video images.

56. The method of claim 55 further comprising the step of:

selectively controlling the intensity of each individual lamp by turning on the lamp for a certain amount of time, said amount of time being dependent upon the desired intensity.

57. The method of claim 55 further comprising the step of:

selectively controlling the intensity of each individual lamp by powering the lamps with a voltage having an amplitude dependent on the desired intensity of each individual lamp.

58. The method of claim 55 further comprising the step of:

selectively controlling the intensity of each individual lamp by turning on the lamp for a certain amount of time with a voltage having a certain amplitude, said certain amount of time and certain voltage both being dependent on the desired intensity of each individual lamp.

59. The method of claim 55 further comprising the steps of:

selectively controlling the intensity of each individual lamp by turning on the lamp at a time after an AC power signal zero crossing based on a digital lamp intensity value and leaving the lamp on for the remainder of that half cycle of the AC power.

60. The method of claim 55 further comprising the step of:

turning on all of the lamps for a certain amount of time during each cycle of the AC power signal to extend lamp life.

61. The large scale video display of claim 5 wherein said processor receives the digitized video signals in RGB format and converts the signal into RGGB format.

62. The large scale video display of claim 5 wherein said processor receives the digitized video signals in RGB format and converts the signal into RGBB format.

* * * * *